(No Model.)
O. THOMAS.
LOBSTER TRAP.
No. 392,296. Patented Nov. 6, 1888.
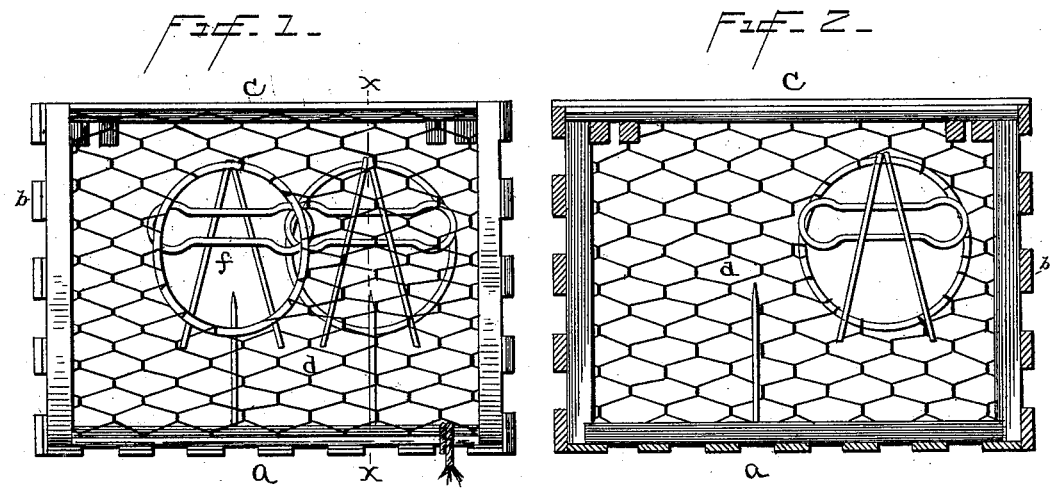
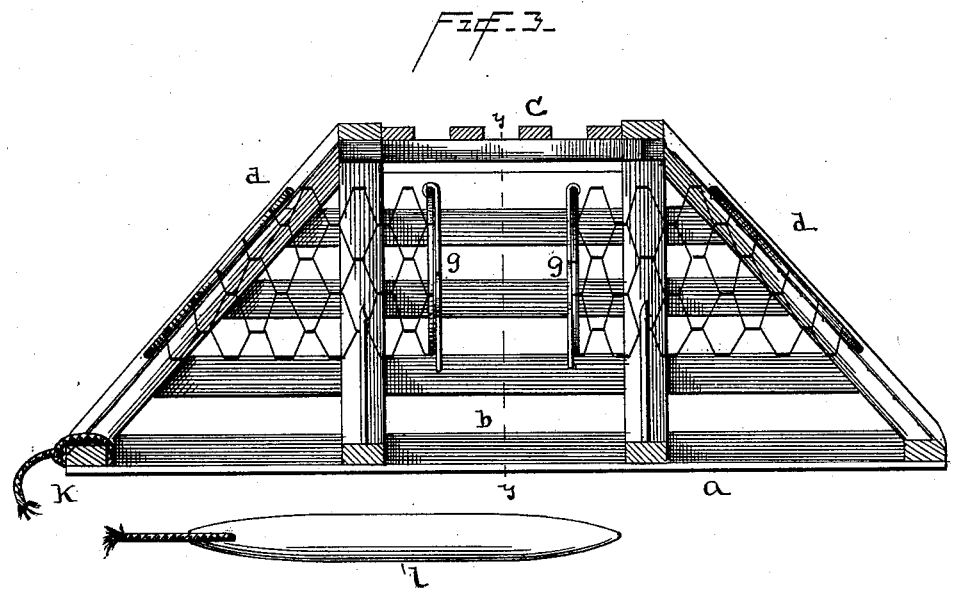
WITNESSES
Norris A. Clark,
L. M. Bartlett.
INVENTOR
Omar Thomas.
By W. H. Bartlett,
Atty.

UNITED STATES PATENT OFFICE.

OMAR THOMAS, OF NORTH HAVEN, MAINE.

LOBSTER-TRAP.

SPECIFICATION forming part of Letters Patent No. 392,296, dated November 6, 1888.

Application filed September 20, 1888. Serial No. 285,854. (No model.)

*To all whom it may concern:*

Be it known that I, OMAR THOMAS, residing at North Haven, in the county of Knox and State of Maine, have invented certain new and useful Improvements in Lobster-Traps, of which the following is a specification, reference being had therein to the accompanying drawings.

This invention relates to under-water traps for catching lobsters.

The invention consists in the construction of a combined wood and wire trap, substantially in the manner hereinafter set forth.

Figure 1 is an end view of the trap, showing the reticulated wire end casing and the entrances for the fish. Fig. 2 is a central cross-section of the trap. Fig. 3 is a vertical longitudinal section near the center of the trap.

The letter $a$ indicates the bottom of the trap. This bottom is composed of slats attached to suitable cross-bars, and is of sufficient length (say three to five feet long) to make a trap of good capacity.

The sides $b$ of the trap are preferably perpendicular, and, like the bottom and top, composed of slats far enough apart to permit the water to pass through quite freely, but not to permit the entrance or escape of fish of any considerable size.

The top $c$ of the trap is considerably shorter than the bottom. The ends $d$ of the trap are inclined, as shown in the drawings, and are composed of reticulated wire, which is preferably galvanized.

The body of the trap is thus a rectangular box made of slats, having inclined ends made of woven wire of a coarse mesh. The wire ends each have an inwardly-extending tube, $f$, which tube is also composed of woven wire, and may be conical or of other form. The inwardly-extending tubes or passage-ways $f$ may be conical, if more convenient in construction. The inner ends of these tubes have open-work wire gates, $g$, hung at their upper edges, so that the gates will have a tendency to close by gravity. A couple of barbed bait-hooks, $h$, may be attached to any convenient part of the inside of the casing. The cover or top $c$ is removable, being either hinged or otherwise suitably attached to the casing. This cover can be removed and the trap turned wrong side up to empty out the fish.

A line, $k$, is attached to the bottom of the trap at one end, and has a buoy or float, $l$, attached to its other end. The position of the trap is shown by this float, and the trap may be raised and lowered or drawn along beneath the water by this float-line, the form of the trap facilitating movement in any direction.

The trap is set by baiting the hooks $h$ and placing the trap in the vicinity of lobsters. As a lobster enters one of the passages $d$, the door or gate $g$ swings open to permit the entrance of the fish, and then closes and stays closed against a pressure to pass out.

The passages $d$ are placed near the sides of the trap, by preference, so that a fish entering one passage and moving straight forward will not encounter another fish entering the other passage, but will pass by the tubular entrance-way at one side thereof.

Should the slats prove insufficient, the sides, bottom, and top of my trap may be lined with woven wire.

The form of my trap facilitates the handling and emptying thereof. The substances of which it is composed make it stronger than a trap composed in part of twine-netting, as has usually been the case.

What I claim is—

1. A lobster-trap having a short top and a longer bottom composed of wooden slats, upright sides of slats, and inclined ends of reticulated wire, the ends having passage-ways for the entrance of the fish, all being combined substantially as set forth.

2. A lobster-trap having bottom, sides, top, and ends, substantially as described, the ends being of woven wire, and having entrance-tubes for passages for the fish, as described, and hinged open-work wire gates attached to the inner ends of said tubes, all combined substantially as described.

3. The combination, in a lobster-trap, of the casing having inclined ends, an open tubular passage-way at each end, but at one side of the middle and extending inwardly, and swing-gates at the inner ends of the passage-ways closing outwardly, all substantially as described.

4. In a lobster-trap, the combination of a casing of wire and slats of the form described, inwardly-extending tubes at the ends having outwardly-closing gates at their inner ends, and a float attached to the bottom of the trap by a line of suitable length, all being and operating substantially as described.

In testimony whereof I affix my signature in presence of two witnesses.

OMAR THOMAS.

Witnesses:
G. HORN WIGGIN,
F. B. HATCH.